United States Patent [19]

Hessling et al.

[11] Patent Number: 4,508,483

[45] Date of Patent: Apr. 2, 1985

[54] LIFTING DEVICE FOR A MAGAZINE FOR EMPTY PALLETS IN AN AUTOMATIC PALLETIZING MACHINE

[75] Inventors: Heinz W. Hessling, Beckum; Gottfried J. Weykam, Hesslerstrasse 14, 4700 Hamm 1, both of Fed. Rep. of Germany

[73] Assignee: Gottfried J. Weykam, Hamm, Fed. Rep. of Germany

[21] Appl. No.: 478,075

[22] Filed: Mar. 23, 1983

[30] Foreign Application Priority Data

Mar. 23, 1982 [DE] Fed. Rep. of Germany ....... 3210547

[51] Int. Cl.³ ............................................... B65G 59/06
[52] U.S. Cl. ..................................... 414/127; 414/101
[58] Field of Search ................. 414/95, 101, 126, 127; 221/292, 293

[56] References Cited

U.S. PATENT DOCUMENTS

| 3,245,557 | 4/1966 | Maramonte et al. | 414/101 X |
| 3,757,971 | 9/1973 | Frish | 414/127 |
| 3,782,591 | 1/1974 | Fries | 414/127 X |
| 4,043,460 | 8/1977 | Steele | 414/127 X |

FOREIGN PATENT DOCUMENTS 159453  4/1964  U.S.S.R. ......................... 414/127

Primary Examiner—Leslie J. Paperner
Attorney, Agent, or Firm—Michael J. Striker

[57] ABSTRACT

Lifting device for a magazine containing a number of empty pallets stacked in a pile therein, which comprises two opposite vertically movable frames mounted at the opposite vertical walls of the magazine. The frames are provided with rollers guided in the upper rails and the lower rails such that the frames having grippers lift all the pallets in the magazine except the lowermost one to separate from that lowermost pallet all overlying pallets.

2 Claims, 1 Drawing Figure

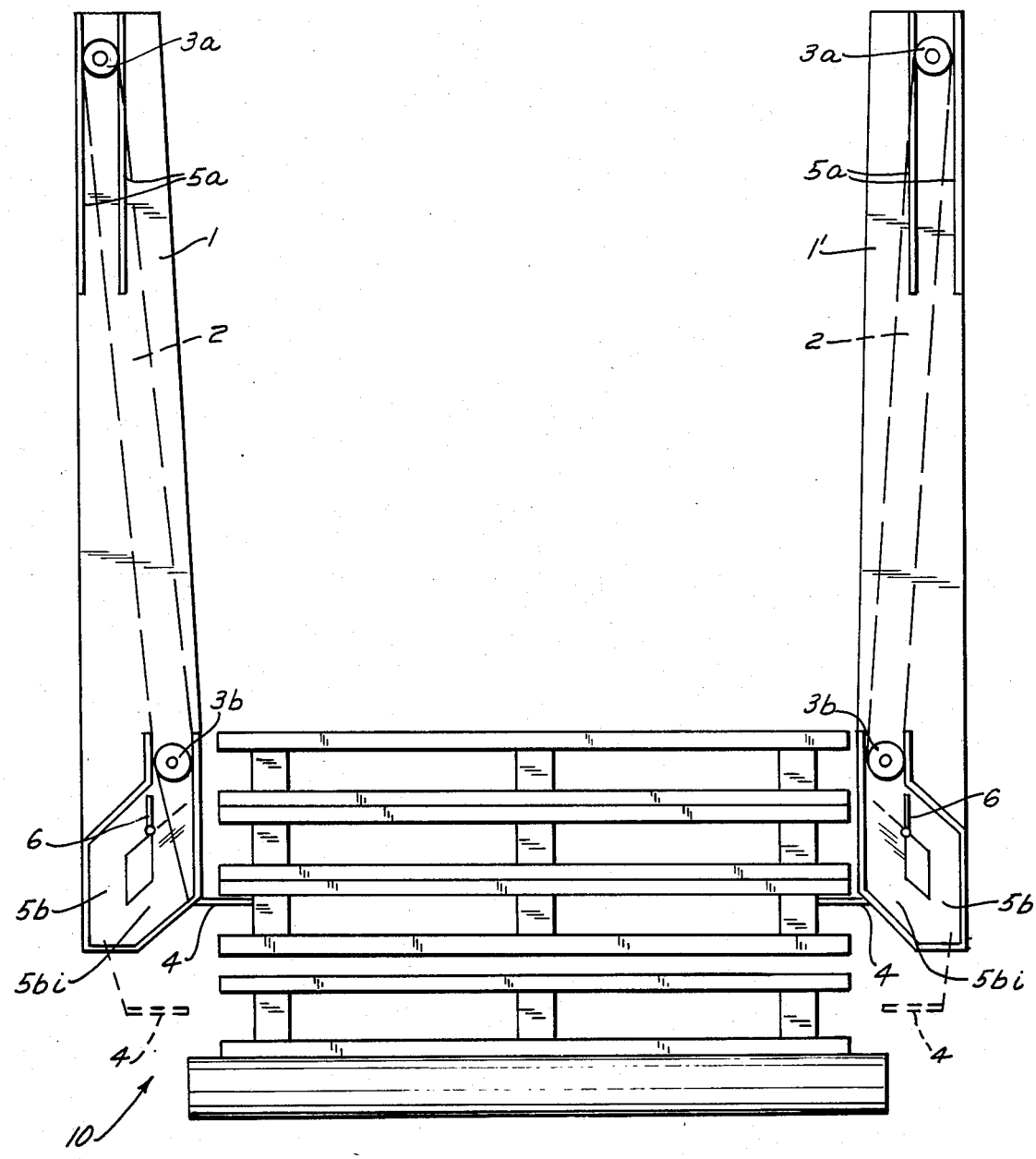

LIFTING DEVICE FOR A MAGAZINE FOR EMPTY PALLETS IN AN AUTOMATIC PALLETIZING MACHINE

BACKGROUND OF THE INVENTION

The present invention pertains to automatic palletizing machines in general, and more particularly to a lifting device utilized for lifting pallets accommodated in a magazine for empty pallets.

It has been suggested in palletizing of certain objects, such as for example bags filled with various goods to supply a various number of empty pallets to a pallet magazine existing in the automatic palletizing machine and store those pallets in the magazine in order to provide a continuous and uninterrupted loading process. In the known process a lowermost pallet in a pile of pallets accommodated in the magazine is pulled out from the magazine and fed to a loading station of the machine. In order to permit the lowermost pallet to be withdrawn from the pile all overlying pallets must be lifted. Various lifting devices such as movable fork lifts, have been utilized for this purpose. All those lifting devices, however, have required considerable space and have been found rather bulky for use in the automatic palletizing machines.

SUMMARY OF THE INVENTION

It is an object of the present invention to provide an improved lifting device for a pallet-containing magazine.

It is a further object of the invention to provide a lifting device which requires less technical expenditures and less energy as compared to those known in the art.

It is still another object of the invention to provide a lifting device which requires no special space in addition to that occupied by the pallet magazine.

The objects of the invention are attained due to installation of the lifting device in the walls of pallet magazine.

These and other objects of the invention are attained by a lifting device for a magazine for empty pallets and formed with two opposite walls, the lifting device comprising two frames each mounted in a respective opposite wall of the magazine and vertically movable upwardly and downwardly.

Each movable frame has an upper end and a lower end in the region of the pallets contained in said magazine, said frames being each provided with an upper roller at the upper end thereof and a lower roller at the lower end thereof.

Each of the frames may be further provided at the lower end thereof with a gripper engageable with a pallet in said magazine when the frames are moved in the upward direction.

Furthermore, the lifting device may include upper rails each provided at one of two opposite walls and guiding the respective upper roller during upward and downward movement of the frames.

According to a still further feature of the invention the lifting device may include lower rails each mounted on one of said opposite walls and guiding the respective lower roller during upward and downward movement of said frames.

The lower rails of the device may be each provided with a bend forming a curved track for the respective lower roller, the tracks of the lower rails positioned on said opposite walls being inclined in opposite directions with respect to the pallets in said magazine.

The device of the invention may further include switch means provided in each bend in the upper region thereof for guiding the respective lower roller toward the respective track in said upward and downward movement. Each switch means may include a switch operated by a spring, weight or any other suitable actuating means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE of the drawing schematically illustrates a lifting device according to the invention.

DETAILED DESCRIPTION OF THE PREFERRED EMBODIMENT

Referring now to the drawing, the lifting device of the invention includes two movable opposite frames 2 mounted in two opposite walls 1 and 1' of the pallet magazine generally denoted as 10. Each frame is provided with an upper guide roller 3a adapted to run in a respective stationary upper rail 5a and a lower guide roller 3b adapted to run in a respective stationary lower rail 5b.

Frames 2 are also each equipped with a gripper denoted as 4 and provided at the lower end thereof.

Both lower rails 5b are formed with bends or curved portions 5bi which define a non-linear path of rollers 3b when the latter are guided in those bent portions of the rails during the movement of the frames 2 in upward and downward direction. Any suitable lifting means can be employed in this device for moving the frames of the proposed lifting device vertically downward and upward.

The upper guide rollers 3a run in vertical rails 5a respectively upwardly and downwardly. The lower guide rollers 3b of each frame run in two separate opposite bends 5bi of opposite convexity when the frames are moved upward or downward. Rails 5a and 5b are stationarily secured to the walls 1 of the magazine.

A respective switch 6 is provided at the upper region of the respective bent portion. The switches determine different ways of running of the lower rollers 3b in the bent portions of the rails depending on the direction of movement of frames 2 upwardly or downwardly. In other words, switches 6 serve as guide means for rollers 3b in their movement in the rails 5b.

When the lifting device is in its lower end position, in other words, when the whole device is moved downwardly by any conventional means or manually, the lower rollers 3b are in lateral position at the lower junction of the bends. Grippers 4 in this position do not engage the pallet pile (as shown by dotted line).

When now the lifting device is moved upward the lower rollers 3b are first moved vertically upwardly and then are led centrally of the respective bends so that two opposite grippers engage the second lowermost pallet from below. Thus in the upper end position of the lifting device or frames 2 the pallet pile held by grippers 4 is lifted and separated from the lowermost pallet. It is to be realized that guide rollers 3b during the movement in the upward direction pass the respective switch 6.

Switch 6 may be of any suitable shape, for example a turnable arm actuated by a spring or by weight.

The released lowermost pallet is withdrawn from the pallet magazine 10 by suitable conventional means used in automatic palletizing machines and fed to a loading station of the machine. The lifting device thereafter starts its movement back in the downward direction. During this downward movement the lower rollers 3b guided by switches 6 in the respective rails 5b are first led vertically until the pallet pile is laid down onto the base of the magazine. The rollers 3b are guided along the curved tracks in the bends 5bi laterally to their lower end positions along the curved tracks of the bends whereby grippers 4 are pulled out from the engagement with the pallet which is now the lowermost in the pile.

The above described operation is repeated until all the pallets in the pile are withdrawn from the magazine and the latter is empty.

It will be understood that each of the elements described above, or two or more together, may also find a useful application in other types of lifting devices differing from the types described above.

While the invention has been illustrated and described as embodied in a lifting device for a magazine containing empty pallets in an automatic palletizing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lifting device for a magazine for empty pallets stacked therein, formed with two opposite walls, and comprising two frames each mounted in a respective opposite wall of the magazine and vertically movable upwardly and downwardly to lift overlying pallets from a lowermost pallet in the magazine; each of said frames having an upper end and a lower end in the region of the pallets contained in said magazine and being provided with an upper roller at the upper end thereof and a lower roller at the lower end thereof and with a gripper engageable with a pallet in said magazine when said frames are moved upwardly; two opposite upper rails each being rigidly secured to one of the opposite walls and guiding the respective upper roller during the upward and downward movement of said frames; two opposite lower rails each being rigidly secured to one of the opposite walls and guiding the respective lower roller during the upward and downward movement of said frames, each of said lower rails including a bend forming a curved track for the respective lower roller, the tracks of the lower rails positioned on said opposite walls being inclined in opposite directions with respect to the pallets in said magazine; and switch means provided in each bend in an upper region thereof for guiding the respective lower roller along the respective track in said upward and downward movement such that in said downward movement of said frames said grippers are disengaged from the pallets and moved laterally away therefrom and in said upward movement of said grippers engage a second lowermost pallet from below and lift the underlying pallets from the lowermost pallet in said magazine.

2. The device as defined in claim 1, wherein said switch means includes a switch operated by a spring.

* * * * *